United States Patent Office 3,310,366
Patented Mar. 21, 1967

3,310,366
METHOD OF TREATING EXHAUST GASES
Karl Hermann Koepernik, Hannover, Germany, assignor to Kali-Chemie Aktiengesellschaft, Hannover, Germany, a corporation of Germany
No Drawing. Filed Dec. 18, 1962, Ser. No. 245,397
Claims priority, application Germany, Dec. 20, 1961, K 45,482
3 Claims. (Cl. 23—2)

The present invention relates to valuable catalysts of remarkable strength properties and high resistance to abrasion and more particularly to a process for producing such catalysts and alumina carriers therefor which are especially useful for substantially completely oxidizing exhaust gases from internal combustion engines, and to such catalysts.

Purification of the exhaust gases from internal combustion engines by complete combustion becomes a more and more pressing problem with increasing traffic density. A satisfactory solution of this problem, however, has not yet been found due to the many difficulties encountered thereby. Catalysts which are useful for this purpose must have, among others, the following properties: They must possess a particularly high oxidizing activity and must be resistant to abrasion because the catalyst is exposed to continuous mechanical stress due to the vibration of the motor, the pulsating impulses of the exhaust gas pressure, and the vibrations and shocks of the vehicle during driving. In addition, a suitable catalyst must have a high thermal stability because, on combustion of the exhaust gases which usually takes place at a temperature between about 500° C. and about 700° C., there may occasionally be observed temperatures from about 900° C. up to about 1100° C., for instance, when the concentration of hydrocarbons in the exhaust gases is relatively high due to the malfunctioning of a spark plug. Furthermore, most fuels contain tetraethyl lead to increase their octane number. As a result of said lead content the activity of the catalyst is gradually reduced due to the deposition thereon of non-volatile lead compounds, especially of lead oxide formed on combustion.

It is one object of the present invention to provide a catalyst which meets all these requirements and possesses not only a surprisingly high activity but also remarkably high mechanical strength properties and heat stability.

Another object of this invention is to provide a process of making such a catalyst.

A further object of this invention is to provide a catalyst carrier of the alumina type which meets all the requirements mentioned hereinabove and has a considerably prolonged service life.

Still another object of the present invention is to provide a process of making such an alumina catalyst carrier.

A further object of the present invention is to provide a method for the combustion of exhaust gases of internal combustion engines.

Other objects of the present invention and advantageous features thereof will become apparent as the description proceeds.

In principle, the present invention consists in first producing an alumina carrier of excellent strength properties, heat stability, and a prolonged service life by adding ammonia to an aluminum salt solution and especially to a solution of aluminum nitrate or aluminum chloride, filtering off and washing the precipitated aluminum hydroxide gel, drying said gel, grinding it to a particle size below 100μ, peptizing said dried particles by a treatment with dilute acetic acid so as to produce a paste of a consistency sufficient to permit extrusion, shaping the peptized aluminum hydroxide, and finally drying and calcining the pellets at a temperature between about 900° C. and about 1300° C. The resulting alumina catalyst carrier bodies are then impregnated with a solution of metal compounds which catalytically activate combustion of carbon monoxide, hydrocarbons, and the oxidation products of hydrocarbons, such as aldehydes and the like, whereafter the impregnated catalyst carrier is dried and again calcined to decompose the metal compounds.

A catalyst produced in this manner is distinguished from heretofore available catalysts by its high thermal stability. Such a high thermal stability is not required of alumina catalysts as they are used extensively in the mineral oil industry, because thereby, the catalysts are used only for reactions, such as cracking, desulfurizing, hydrogenating, dehydrogenating, and the like which proceed at a maximum temperature of about 500° C. In contrast thereto, the catalysts according to the present invention as they are used to effect combustion or, respectively, oxidation of hydrocarbons, carbon monoxide, and the other compounds present in exhaust gases must be stable at temperatures up to 1100° C. because such temperatures may be attained in such reaction. Heretofore known catalyst carriers of activated aluminum oxide which had been subjected to temperatures of 500° C. and at the most of 750° C. during their production are unsuitable for use in reactions taking place between about 800° C. and about 1100° C. because alumina undergoes considerable structural changes at such a high temperature and the catalysts thus are rapidly rendered unsuitable for most uses. In contrast thereto the activity of a catalyst prepared with a carrier according to the present invention is not at all or only slightly impaired at combustion temperatures above 500° C. even when exposed to such temperatures for a prolonged period of time.

A further advantage of catalysts according to the present invention is their remarkable resistance to abrasion and vibration. As a result thereof such a catalyst is especially suitable for use in the complete combustion of exhaust gases in motor vehicles due to its prolonged service life.

The resistance to abrasion of such exhaust gas combustion catalysts, however, must not be too high because then non-volatile lead compounds derived from the lead-containing fuels may be deposited at and adhere to the surface of the catalyst. As a result thereof the catalyst would gradually become inactivated. The catalyst according to the present invention, however, undergoes to a certain degree abrasion at its surface on use in motor vehicles so that the lead compounds which are deposited in small amounts on its surface do not adhere thereto to any large extent. Thus the activity of the catalyst is not at all or only slightly impaired and its service life is considerably prolonged.

Another prerequisite for the usefulness of catalysts on prolonged use and continuously progressing abrasion of the surface is that the catalytically active metal is distributed as uniformly as possible on the carrier and also in the interior of the carrier, so that gradual abrasion of the surface continuously exposes new effective catalyst surfaces to the exhaust gases. A catalyst produced according to the present invention has the required abrasion resistance and is favorably distinguished from other catalysts by the uniform distribution of the active agent within the carrier.

Essential features of the present invention which are responsible for resulting in all the above mentioned advantageous properties are the following steps of preparation:

(a) Use of an aluminum hydroxide gel precipitated by means of ammonia from an aluminum salt solution and especially from a solution of aluminum nitrate or aluminum chloride;

(b) drying the hydroxide gel and grinding the dried gel to a particle size below 100μ;

(c) peptizing the ground aluminum hydroxide gel with acetic acid to permit proper extruding to catalyst carrier bodies of suitable dimensions; and (d) final calcination at a temperature of at least 900° C., preferably at a temperature between about 1100° C. and 1300° C.

The resulting alumina carriers show an X-ray powder diffraction pattern of α-alumina, they have a specific surface area of 1–20 m.$^2$/g. and a specific pore volume of 0.20–0.30 cc./g.

It has proved of advantage to precipitate the aluminum hydroxide gel at a temperature between about 20° C. and about 40° C. and at a pH-value not exceeding a pH of 9.0 and preferably at a pH between 8.0 and 9.0. The resulting precipitate is filtered off and is washed by repeatedly suspending it in dilute ammonia solution until the nitrate content or, respectively, the chloride content of the filter cake is between about 40 mg. and about 80 mg., calculated for 1 g. of anhydrous aluminum oxide. Usually it is sufficient to suspend the aluminum hydroxide gel three times to four times, for instance, in an 0.25% ammonia solution in order to properly wash the gel.

When the extruded molded bodies are finally calcined at a temperature of at least 1100° C., the following shortened washing procedure is preferred. The filter cake, after the first filtration, is suspended only once in demineralized water at a temperature of preferably 90° C. and is again filtered. The relatively large amounts of acid anions remaining in the filter cake are substantially completely removed on finally calcining the catalyst carrier bodies at a temperature of at least 1100° C. and have no disadvantageous effect on the stability of the shaped bodies.

After washing, the filter cake is dried at a temperature between about 120° C. and about 180° C. while fresh air is introduced into the drier until its content of chemically bound water and ammonium ions and nitrate ions, or, respectively, chloride ions is about 25% to about 35%. The resulting alumina can now be ground in the dry state. In order to improve the mechanical strength properties of the pellets, it has been found of advantage to knead the filter cake, before it is transferred from the filter press to the drying oven, with a small amount of acetic acid. The comminuted filter cake placed on drying trays is sprayed for this purpose, for instance, by means of a spray gun with a 50% acetic acid solution and is then kneaded manually or by means of a suitable masticating device before it is placed into the drying oven. 100 cc. to 200 cc. of 50% acetic acid are added to 20 kg. of filter cake. Thereafter, drying takes place as described hereinabove.

The dried filter cake is then ground. It is known to grind the carrier material before the catalyst carrier bodies are prepared. However, usually grinding of the filter cake was effected while it was still wet. The particle size of the ground material was between about 0.5μ and about 20μ, thereby yielding alumina catalyst carrier bodies of high strength properties. Grinding according to the present invention, in contrast thereto, is carried out in the dry state and preferably by means of an vibrating ball mill. Such a mill produces an especially satisfactory grinding effect. As stated hereinabove, the aluminum hydroxide gel is ground, according to the present invention, in the dry state. After grinding, the ground material has a particle size below 100μ. After grinding for 4 to 6 hours, those particles of the ground material which are larger than 0.1 mm. are removed by screening. Grinding to very fine particles such as colloidal grinding is not required. However, dry grinding according to the present invention, in combination with the other above mentioned steps of procedure, is necessary in order to yield catalyst carrier bodies of the desired properties.

To extrude the dried and ground aluminum hydroxide gel it is kneaded and peptized with an amount of 0.5% to 3.0%, preferably of 1%, of acetic acid sufficient to convert it into a paste of a consistency permitting extrusion. Preferably, the acetic acid-treated mass is stored for eight to sixteen hours before extrusion, drying, and calcining. By permitting the peptized mass to stand with acetic acid, uniform peptization is achieved and, as a result thereof, the mechanical strength properties of the final pellets can be increased further.

Shaping is preferably effected by means of an extruder consisting of a cylinder and a hydraulic driven piston as it is manufactured by the firm Werner & Pfleiderer, Germany, or by means of a so-called shaping granulating machine manufactured by the firms Hutt and Alexander-Werk, Germany. When using an extruder, the resulting strands are cut into small pieces. The dimensions of the extruded bodies are preferably such that, by taking into consideration the shrinkage occurring on drying and calcination, the calcined pellets have a length and a diameter of about 4 mm. But it is also possible to make pellets of other dimensions depending on the intended use. The extruded bodies or pellets are first dried and finally calcined at a temperature between about 900° C. and about 1300° C. Preliminary drying for subsequent calcination may be effected in two steps, first at 150° C. and finally at 450° C. A preferred method consists in drying the humid pellets in a drying oven without introduction of fresh air, the oven having a temperature of 80° C. at the beginning and then gradually increasing the temperature to 150° C. Calcination is completed within about two hours to three hours when operating at a temperature between about 900° C. and about 1100° C., while, when operating at 1200° C., one hour to two hours, and, when operating at 1300° C., one half hour to one hour are required.

The resulting carrier bodies are then impregnated in a manner known per se with a solution of catalytically effective metal compounds which accelerate combustion of carbon monoxide, hydrocarbons, and carbon-hydrogen-oxygen compounds. Noble metal compounds and especially platinum and palladium compounds and also silver compounds may be used for impregnation. Of non-noble metals there are preferably employed the compounds of copper, chromium, manganese, nickel, cobalt, iron, and others which are deposited in the form of the oxides on the carrier according to the present invention.

Under certain conditions it may be of advantage to use combinations of noble metals with each other and also with non-noble metals. Combinations of various non-noble metals may also be used.

A particularly suitable noble metal combination for the catalytic purification of the exhaust gases is platinum and palladium, preferably used in concentrations of 0.05% to 0.10% platinum and 0.01% to 0.03% palladium, based on the total catalyst weight. By increasing the amount of platinum it is possible to improve the combustion of hydrocarbons whereas by increasing the palladium concentration the combustion of carbon monoxide will be improved.

Of the non-noble metals a copper oxide-chromium oxide combination gives good results in the combustion of exhaust gases. In general a molar ratio of $CuO:Cr_2O_3$ of 1:0.5 is used in the impregnating solution, but it is also possible to use a molar ratio of 4:0.5 up to 1:2.

Preferred combinations are those which possess a good catalytic activity in the oxidation of carbon monoxide at temperatures as low as possible. In this respect the combination of $MnO_2$ with CuO, $Co_2O_3$ and $Ag_2O$ is particularly suitable. The combination should consist of 30% to 60% by weight of $MnO_2$, 25% to 40% by weight of CuO, 10% to 20% by weight of $Co_2O_3$ and 3% to 8% by weight of $Ag_2O$. If the alumina carriers produced as described hereinbefore are impregnated with these metal oxides, the resulting catalysts show an excellent activity for the combustion of CO at as low a temperature as 200° C., even if the catalysts contain only about 2% to 5% of all metal oxides together.

The catalytic activity of all such metal combinations is substantially enhanced when deposited on an alumina carrier produced according to the present invention. The combination of the active metals or metal oxides, respectively, with the alumina carrier according to the invention which per se is characterized by a high mechanical strength results in catalysts which are particularly resistant against aging at very high temperatures in the range between 800° C. and 1100° C.

To decompose the metal compounds deposited on the catalyst carrier, final calcination of the impregnated catalyst carrier bodies is preferably carried out, as described in the examples, at about 800° C. although higher temperatures up to 900° C. may also be used, depending upon the activating metal compound used for impregnation.

The following examples serve to illustrate the present invention without, however, limiting the same thereto.

EXAMPLE 1

100 kg. of aluminum nitrate ($Al(NO_3)_3 \cdot 9H_2O$) are dissolved in 420 l. of water. 70 l. of ammonia solution (density: 0.907 at 20° C.) are added at room temperature while stirring vigorously, so as to yield a pH-value of 9.0. The precipitated aluminum hydroxide gel is filtered off by means of a filter press and repeatedly washed by suspending it in 0.25% ammonia solution until the nitrate content of the filter cake is about 40 mg. to 80 mg. per g. of anhydrous aluminum oxide. The filter cake is dried in a drying oven for several hours while fresh air is introduced thereinto, finally at a temperature of about 150° C. until the content of bound water in the hydrated oxide is about 25% to 30%. The dried aluminum oxide hydrate is ground in the dry state in a vibrating ball mill for several hours until about half of the ground material has a diameter smaller than 100μ. Coarser particles are separated by sifting and are again ground. The ground hydrated oxide is mixed and peptized with such an amount of 1% acetic acid that a paste of a consistency permitting extrusion is obtained. The peptized mass is then extruded to strands of 6 mm. diameter and cut to pellets of 6 mm. length. The pellets are dried first at a temperature of 150° C. and, in a second drying step, at a temperature of 450° C. They are then calcined at a temperature of 900° C. for one hour. The catalyst carriers are finally impregnated with an 0.1% solution of platinum (II)-tetrammine chloride, dried, and calcined at 800° C.

The resulting catalyst pellets have a diameter and a length of 4 mm. Their abrasion was tested as follows: 100 cc. of the catalyst were subjected to the vibratory action of a laboratory mill sold under the trademark "Vibratom" by the firm Siebtechnik G.m.b.H. of Muehlheim/Ruhr, Germany, and the catalyst pellets were treated in said mill which was provided with two porcelain vessels of 1 l. each, without balls at a frequency of 1450 vibrations per minute and an amplitude of vibration of 4 mm. for 16 hours. The loss of weight was determined to be about 5% by sieving the pellets through a 3 mm. sieve. The crushing strength of the catalyst pellets was found to be between 15 kg. and 25 kg.

The activity of said catalyst was determined as follows: A gas mixture of 3.0%, by volume, of carbon monoxide, 5.2%, by volume, of oxygen, 91.8%, by volume, of nitrogen, or a mixture of 0.46%, by volume, of n-hexane, 5.24%, by volume, of oxygen, and 94.3%, by volume, of nitrogen was used for testing the activity. The space velocity was 28.6 cu. m./hour/l. (temperature: 20° C.). The rate of combustion of the carbon monoxide was 96.3%, the rate of combustion of the n-hexane was 92.4%, when the gas mixture entered the catalyst at a temperature of 300° C.

EXAMPLE 2

100 kg. of aluminum nitrate ($Al(NO_3)_3 \cdot 9H_2O$) are dissolved in 420 l. of water. 70 l. of ammonia solution (density: 0.907 at 20° C.) are added at a temperature of 35° C., while stirring vigorously, thereby yielding a pH-value of 9.0. The precipitated aluminum hydroxide gel is filtered off by means of a filter press and washed repeatedly by suspending it in 0.25% ammonia solution until the nitrate content of the filter cake is about 40 mg. to 80 mg. per g. of anhydrous aluminum oxide. The filter cake is dried in a drying oven while fresh air is introduced thereinto, finally at a temperature of about 150° C. for several hours until the content of bound water of the hydrated oxide is about 25% to 30%. The dried aluminum hydroxide gel is ground in the dry state in a vibrating ball mill for several hours until most of the ground material has a diameter smaller than 100μ. Coarser particles are separated by sieving and are again ground. The ground aluminum hydroxide gel is kneaded and peptized with such an amount of 1% acetic acid, that a paste of a consistency permitting extrusion is obtained. The paste is extruded to strands of 6 mm. diameter which are cut to pellets of 6 mm. length. The pellets are dried at a temperature of 150° C. and are then calcined by heating gradually to a temperature of 1100° C. for 2 hours.

The resulting catalyst carriers are then impregnated with a platinum-palladium solution, which contains 0.05% of platinum in the form of chloro platinic acid $H_2PtCl_6$ and 0.02% of palladium as palladium chloride $H_2[PdCl_2(OH)_2]$, dried, and calcined at a temperature of 800° C. for 2 hours. The resulting catalyst consists of pellets of a diameter of 4 mm. and a length of 4 mm. Their platinum content is about 0.05%, their palladium content about 0.02%.

The catalyst pellets show in the abrasion test by means of a vibrating mill a loss of about 2.8% and a crushing strength of 20 kg. to 30 kg.

The activity of the catalyst was tested by combustion of the following gas mixture: 3.0%, by volume, of carbon monoxide, 5.2% by volume, of oxygen, 91.8%, by volume, of nitrogen. The space velocity of said gas mixture was 28,600 l. per hour per l. of catalyst, i.e. 28.6 cu. m./hour/l. (temperature: 20° C.). The rate of combustion of the carbon monoxide was 89.0% when the gas mixture entered the catalyst bed at a temperature of 200° C.; but was 99.3% at a temperature of 250° C. The rate of combustion of the carbon monoxide was 69.0% at a temperature of 250° C. and 98.5% at a temperature of 300° C. when the catalyst was aged, i.e. calcined at 1100° C. for 12 hours.

The activity of the catalyst was tested in a similar manner with respect to the combustion of n-hexane. The gas mixture was composed as follows: 0.46%, by volume, of n-hexane, 5.24%, by volume, of oxygen, 94.3%, by volume, of nitrogen. The space velocity was 28.6 cu. m./hour/l. (temperature: 20° C.). The rate of combustion of the hexane was 79.3%, when the gas mixture entered the catalyst bed at 350° C. The rate of combustion was still 30.4% under the same conditions, when the catalyst had previously been aged at 1100° C. for 12 hours.

The contents of carbon monoxide and hexane were determined by means of a non-dispersive infrared absorption meter which permits continuous gas analysis.

EXAMPLE 3

100 kg. of aluminum nitrate ($Al(NO_3)_3 \cdot 9H_2O$) are dissolved in 420 l. of water. 60 l. of ammonia solution (density: 0.907 at 20° C.) are added at a temperature of 35° C. while stirring vigorously, thereby yielding a pH-value of 8.2. The precipitated aluminum hydroxide gel is filtered off by means of a filter press, washed by suspending it in demineralized water at 95° C., and immediately filtered off. The filter cake is dried in a drying oven for several hours while fresh air is introduced thereinto, finally at a temperature of 150° C. until the contents of bound water, ammonia, and nitrate ions in the hydrated oxide are about 25% to 35%. Further working up of the precipitated aluminum hydroxide gel is carried out as described in Example 2.

The pellets, calcined at a temperature of 1100° C., are impregnated with a solution containing, per liter, 115 g. of manganous nitrate $Mn(NO_3)_2 \cdot 4H_2O$, 135 g. of cupric nitrate $Cu(NO_3)_2 \cdot 3H_2O$, 80 g. of cobaltous nitrate $Co(NO_3)_2 \cdot 6H_2O$, and 10 g. of silver nitrate $AgNO_3$, at room temperature for about one hour. The impregnated catalyst carriers are dried and gradually heated to 800° C. to cause decomposition of the nitrates. Its content of metal oxides is about 3.5%.

Catalyst pellets, prepared in sush a manner which are of a diameter and a length of 4 mm., show an abrasion loss of about 1.8% in the abrasion test by means of the "Vibratom" vibrating ball mill. Their crushing strength is 20 kg. to 30 kg.

The catalyst pellets were further subjected to the following shaking test: 150 cc. of the pellets are filled into an iron cylinder of a volume of 200 cc. with a diameter of 50 mm. and a height of 100 mm. The cylinder is shaken with 300 strokes/minute and a length of stroke of 100 mm. for one hour. After one hour the pellets are sieved through a 3 mm. sieve and their loss in weight is determined. The pellets are made up by the addition of unshaken catalyst carriers to a volume of 150 cc. and are again shaken for one hour. The shaking test is repeated until the loss by abrasion per hour remains constant. The loss by abrasion is then 1.3%.

The carbon monoxide activity of such a catalyst was tested with a gas mixture composed as follows: 3.0%, by volume, of carbon monoxide, 5.2%, by volume, of oxygen, 91.8%, by volume, of nitrogen. Its space velocity was 28.6 cu. m./hour/l. (temperature: 20° C.). The rate of combustion of the carbon monoxide was 88.6%, when the gas mixture entered the catalyst at 200° C., and 98.3% at 250° C. The rate of combustion of the carbon monoxide was still 56.7% at 250° C., 86.7% at 300° C., and 96.3% at 350° C., when the catalyst had been aged previously at a temperature of 1100° C. for 12 hours.

The hexane activity of the catalyst was determined by using the following gas mixture: 0.46%, by volume, of n-hexane, 5.24%, by volume, of oxygen, 94.3%, by volume, of nitrogen. The space velocity was 28.6 cu. m./hour/l. (temperature: 20° C.). The rate of combustion of the hexane was 63.0% when the gas mixture entered the catalyst at a temperature of 300° C., and 78.9% at 350° C. The rate of combustion of the hexane was still 35.2% at a temperature of 350° C., when the catalyst had been aged previously at a temperature of 1100° C. for 12 hours.

EXAMPLE 4

To a solution of 100 kg. of aluminum chloride ($AlCl_3 \cdot 6H_2O$) in 1000 l. of water there are added 85 kg. of aqueous ammonia (density: 0.907 at 20° C.) with vigorous stirring at 35° C. thus yielding a pH-value of 8.4. The precipitated aluminum hydroxide gel is filtered off by means of a filter press, washed once by suspending and stirring the gel in demineralized water at a temperature of 90° C., and again filtered off. The filter cake is kneaded with acetic acid (200 ml. of 50% acetic acid for 20 kg. of filter cake) and then dried for 6 hours, while fresh air is introduced into the drier, finally at a temperature of 150° C., until the contents of bound water as well as ammonium, chloride, and acetate ions of the aluminum hydroxide gel is 25% to 35%. The dry gel is then ground in a vibrating ball mill for several hours until most of the ground material has a diameter smaller than 100µ. The coarser particles are separated by screening and are again milled. The ground gel is then kneaded and peptized with such an amount of 1% acetic acid that a paste of a consistency which permits extrusion is obtained. Said paste is subsequently extruded to pellets of 6 mm. length and diameter. These pellets are dried at 100° C.–150° C. and, after gradual heating, are calcined for 2 hours at 1100° C. After calcination, the pellets are free of chlorine.

The carriers are then impregnated with a solution containing 466 g. of copper nitrate $Cu(NO_3)_2 \cdot 3H_2O$ and 193 g. of chromium (VI) oxide per l. The impregnated catalyst carriers are dried, heated to cause decomposition of the nitrate, and finally calcined at a temperature of 800° C. The content of metal oxides in the catalysts is about 8.8%.

The catalysts, prepared in such a manner, have a crushing strength of 25 kg. to 35 kg. Their abrasion loss is 0.6% as determined in the above described vibration test.

The same gas mixtures as employed in Example 4 are used to determine the carbon monoxide and hexane activity of the catalysts. The space velocity was in all tests 28.6 cu. m./hour/l. (temperature: 20° C.). The rate of combustion of the carbon monoxide was 85.3%, when the gas mixture entered the catalyst bed at a temperature of 250° C., 94.3% at a temperature of 300° C., and 98.1% at a temperature of 350° C. The degree of combustion of the carbon monoxide was 70.0% at a temperature of 250° C., 87.7% at a temperature of 300° C., and 92.7% at a temperature of 350° C., when the catalyst had previously been aged (calcined) at a temperature of 1100° C. for 12 hours.

The rate of combustion of the hexane was 39.6% at 350° C. and 58.6% at 400° C. in the hereinabove described activity test. The rate of combustion of the hexane was 27.8% at a temperature of 350° C. and 36.9% at a temperature of 400° C., when the catalyst had been aged (calcined) at a temperature of 1100° C. for 12 hours.

EXAMPLE 5

100 kg. of aluminum chloride ($AlCl_3 \cdot 6H_2O$) are dissolved in 1000 l. of water. 89 kg. of an ammonia solution (density: 0.907 at 20° C.) are added at a temperature of 35° C. while stirring vigorously, thus yielding a pH-value of 8.8. The precipitated aluminum hydroxide gel is filtered off by means of a filter press, washed once by suspending and stirring the gel in demineralized water at a temperature of 90° C., and again filtered off. The filter cake is kneaded with acetic acid (60 cc. of 50% acetic acid for 10 kg. of filter cake) and dried while fresh air is introduced into the drier, finally at a temperature of 150° C. for 6 hours, until the contents of bound water as well as ammonium, chloride, and acetate ions of the aluminum hydroxide gel is 25% to 35%. The dried gel can readily be ground in the dry state in a vibrating ball mill for several hours until most of the ground material has a diameter smaller than 100µ. The coarser particles are separated by screening and are again milled. The ground aluminum hydroxide gel is kneaded and peptized with such an amount of 1% acetic acid that a paste of a consistency permitting extrusion is obtained. After standing for several hours said mixture is extruded and cut to form pellets of 6 mm. diameter and a length of 6 mm. The pellets are dried first at a temperature of 80° C. The temperature is slowly and gradually increased to 150° C. without the introduction of fresh air and the dried pellets are finally calcined at a temperature of 1200° C. for 1½ hours. After calcination, the pellets are free of chlorine.

The calcined pellets are soaked for about one hour in a solution containing 115 g. of manganese nitrate ($Mn(NO_3)_2 \cdot 4H_2O$), 135 g. of cupric nitrate $$(Cu(NO_3)_2 \cdot 3H_2O)$$

80 g. of cobaltous nitrate $Co(NO_3)_2 \cdot 6H_2O$, and 10 g. of silver nitrate per liter. The impregnated catalyst carriers are dried, heated to cause decomposition of the nitrates, and finally calcined at a temperature of 800° C. The content of metal oxides of said catalysts is about 3.0%.

The resulting catalysts of a diameter and a length of 4 mm. show a crushing strength of 25 kg. to 35 kg. Their abrasion loss, determined by the above described shaking test, is 0.1%.

In addition, mechanical strength tests of such catalysts were carried out after calcination (aging) at 1100° C. for 12 hours. The crushing strength of the catalysts remained substantially unchanged and was 25 kg. to 35 kg. The abrasion loss after aging was about 0.2% as determined by the above described shaking test. Shrinkage of the catalyst in volume was not observed after aging.

The carbon monoxide activity was tested with a gas mixture composed as follows: 3.0%, by volume, of carbon monoxide, 5.2%, by volume, of oxygen, 91.8%, by volume, of nitrogen. The space velocity was 28.6 cu. m./hour/l. (temperature: 20° C.). The degree of combustion of the carbon monoxide was 92.4% when the gas mixture entered the catalyst bed at 200° C. and 96.7% at 250° C. The rate of combustion of the carbon monoxide was 41.7% at a temperature of 200° C., 76.7% at a temperature of 250° C., and 90.6% at a temperature of 300° C. when the catalyst had previously been aged (calcined) at a temperature of 1100° C. for 12 hours.

The n-hexane acctivity of the catalyst was determined with a gas mixture composed as follows: 0.46%, by volume, of n-hexane, 5.24%, by volume, of oxygen, and 94.3%, by volume, of nitrogen. The space velocity was 28.6 cu. m./hour/l. (temperature: 20° C.). The rate of combustion of the hexane was 50.0% when the gas mixture entered the catalyst bed at a temperature of 300° C., and 81.5%, when it entered the catalyst bed at a temperature of 400° C. The rate of combustion of the hexane was 21.8% at a temperature of 300° C. and 67.3% at a temperature of 400° C. when the catalyst had previously been aged at a temperature of 1100° C. for 12 hours.

EXAMPLE 6

The aluminum oxide carriers are prepared by proceeding as described in Example 4, however, with the difference, that the extruded pellets are not finally calcined at a temperature of 1100° C. but at a temperture of 1300° C. for 30 minutes. The carrier pellets are then impregnated with a solution of manganese nitrate, copper nitrate, cobalt nitrate, and silver nitrate as used in Example 5. The content of metal oxides in the resulting catalysts is about 3.4%.

The catalysts prepared in such a manner have a diameter and a length of 4 mm. and show a crushing strength of 30 kg. to 40 kg.

The abrasion loss is 0.4%, as determined by the shaking test.

The carbon monoxide and hexane activity was tested according to Example 4. The space velocity in all tests was 28.6 cu. m./hour/l. (temperature: 20° C.). The rate of combustion of the carbon monoxide was 91.0%, when the gas mixture entered the catalyst bed at a temperature of 250° C., 96.6% at a temperature of 300° C., and 98.7% at a temperature of 350° C. The rate of combustion of the carbon monoxide was 81.0% at a temperature of 250° C., 90.6% at a temperature of 300° C., and 95.3% at a temperature of 350° C., when the catalyst had previously been aged (calcined) at a temperature of 1100° C. for 12 hours.

The rate of combustion of the hexane was 61.0%, when the gas mixture entered the catalyst bed to be tested at a temperature of 350° C., and 73.9% at a temperature of 400° C. The rate of combustion of hexane was still 41.3% at a temperature of 350° C. and 61.0% at a temperature of 400° C., when the catalyst had previously been aged (calcined) at a temperature of 1100° C. for 12 hours.

To cause substantially complete combustion of the exhaust gases, the catalysts according to the present invention are placed into a chamber connected to the exhaust pipe of an internal combustion engine in such a manner that the exhaust gases pass therethrough. A special pump or the like device is required to provide the secondary air for the combustion of the combustible components of the automobile exhaust gases. Suitable exhaust gas purifier devices are known to the art.

I claim:
1. In a process of catalytically effecting substantially complete combustion of exhaust gases from internal combustion engines, the step which comprises passing the exhaust gases with the addition of secondary air at the reaction temperature over and through a catalyst bed consisting of extruded catalyst bodies obtained by process steps which consist in
 (a) adding ammonia to an aluminum salt solution to precipitate aluminum hydroxide gel,
 (b) drying said gel,
 (c) grinding said dried gel to a particle size smaller than 100µ,
 (d) mixing said dried and ground gel with dilute acetic in an amount sufficient to peptize the dried gel and to produce a mixture of a consistency suitable for extrusion,
 (e) extruding said mixture to catalyst carrier bodies,
 (f) drying said carrier bodies,
 (g) calcining said dried carrier bodies at a temperature between about 900° C. and about 1300° C.,
 (h) impregnating said calcined carrier bodies with metal compounds catalytically effecting combustion of exhaust gases,
 (i) drying the impregnated catalyst bodies, and
 (j) calcining the dried bodies at a temperature of at least 800° C.

2. In a process of catalytically effecting substantially complete combustion of exhaust gases from internal combustion engines, the step which comprises passing the exhaust gases with addition of secondary air at the reaction temperature over and through a catalyst bed consisting of extruded catalyst bodies obtained by process steps which consist in
 (a) adding ammonia at a temperature between about 20° C. and about 40° C. to a solution of an aluminum salt selected from the group consisting of aluminum nitrate and aluminum chloride in an amount sufficient to adjust the pH-value of the mixture to a pH not exceeding 9.0 to precipitate aluminum hydroxide gel,
   (aa) filtering said gel,
   (bb) washing the gel with dilute ammonia solution to reduce the content of the gel of anions selected from the group consisting of nitrate ions and chloride ions to an amount between about 40 mg. and about 80 mg. for each g. of anhydrous aluminum oxide,
 (b) drying the ammonia-washed gel at a temperature between about 140° C. and about 180° C. until the content of the dried gel of bound water, ammonium ions, and said anions is between about 25% and about 30%,
 (c) grinding said dried gel to a particle size smaller than 100µ,
 (d) mixing said dried and ground gel with dilute acetic acid in an amount sufficient to peptize the dried gel and to produce a mixture of a consistency suitable for extrusion,
 (e) extruding said mixture to catalyst carrier bodies,
 (f) drying said carrier bodies,
 (g) calcining said dried carrier bodies at a temperature between about 900° C. and about 1300° C.,
 (h) impregnating said calcined carrier bodies with metal compounds catalytically effecting combustion of exhaust gases,
 (i) drying the impregnated catalyst bodies, and (j) calcining the dried bodies at a temperature of at least 800° C.

3. In a process of catalytically effecting substantially complete combustion of exhaust gases from internal combustion engines, the step which comprises passing the exhaust gases with the addition of secondary air at the reaction temperature over and through a catalyst bed consisting of extruded catalyst bodies obtained by process steps which consist in
 (a) adding ammonia at a temperature between about 20° C. and about 40° C. to an aluminum salt solution to precipitate aluminum hydroxide gel,
  (aa) filtering said gel,
  (bb) suspending the gel in substantially demineralized water at a temperature of about 90° C.,
  (cc) again filtering the gel,
 (b) drying the once-washed gel at a temperature between about 140° C. and about 180° C.
 (c) grinding said dried gel to a particle size smaller than 100μ,
 (d) mixing said dried and ground gel with dilute acetic acid in an amount sufficient to peptize the dried gel and to produce a mixture of a consistency suitable for extrusion,
 (e) extruding said mixture to catalyst carrier bodies,
 (f) drying said carrier bodies,
 (g) calcining said dried carrier bodies at a temperature of at least 1100° C.,
 (h) impregnating said calcined carrier bodies with metal compounds catalytically effecting combustion of exhaust gases,
 (i) drying the impregnated catalyst bodies, and
 (j) calcining the dried bodies at a temperature of at least 800° C.

References Cited by the Examiner

UNITED STATES PATENTS

| | | | |
|---|---|---|---|
| 2,667,404 | 1/1954 | Haensel | 23—143 |
| 2,925,394 | 2/1960 | Brennan et al. | 252—466 |
| 2,925,395 | 2/1960 | Vander Haar | 252—466 |
| 2,973,245 | 2/1961 | Teter et al. | 23—143 |
| 3,024,593 | 3/1962 | Houdry | 23—2.2 |
| 3,067,002 | 12/1962 | Reid | 23—2 |
| 3,072,458 | 1/1963 | Page | 23—2 |

FOREIGN PATENTS 441,384  1/1936  Great Britain.

OSCAR VERTIZ, *Primary Examiner.*

MAURICE A. BRINDISI, *Examiner.*

G. T. OZAKI, E. C. THOMAS, *Assistant Examiners.*